United States Patent [19]
Ho

[11] Patent Number: 6,020,888
[45] Date of Patent: Feb. 1, 2000

[54] DISPLAY CONTROL SYSTEM HAVING A WINDOW INTERFACE FOR ORGANIZING PROGRAM AND DIRECTORY ICONS

[75] Inventor: Heng-Chun Ho, Taipei, Taiwan

[73] Assignee: Primax Electronics Ltd., Taipei Hsien, Taiwan

[21] Appl. No.: 09/034,169

[22] Filed: Mar. 2, 1998

[51] Int. Cl.$^7$ ...................................................... G06F 3/00
[52] U.S. Cl. .......................... 345/348; 345/356; 345/342; 345/340
[58] Field of Search ........................... 345/348, 356–357, 345/340, 342, 346, 353

[56] References Cited

U.S. PATENT DOCUMENTS

| | | | |
|---|---|---|---|
| 5,065,347 | 11/1991 | Pajak et al. ............................... | 345/346 |
| 5,606,654 | 2/1997 | Schuur ...................................... | 345/356 |
| 5,712,995 | 1/1998 | Cohn ......................................... | 345/342 |
| 5,739,821 | 4/1998 | Ho et al. .................................... | 345/340 |

*Primary Examiner*—Raymond J. Bayerl
*Assistant Examiner*—Sy D. Luu
*Attorney, Agent, or Firm*—Winston Hsu

[57] ABSTRACT

The present invention provides a display control system having a window interface for organizing program and directory icons. The display control system comprises (1) a computer; (2) a displaying device for displaying a rectangular window interface; (3) a plurality of application programs stored in a memory of the computer; (4) a plurality of directories stored in the memory, each directory comprising a plurality of program entries, each program entry comprising an address and a program icon of one application program; (5) a platform file stored in the memory for storing a plurality of directory entries, each directory entry comprising an address and a directory icon of one directory; (6) a control program stored in the memory for displaying a directory frame and a plurality of icon frames in a non-overlapping manner within the rectangular boundary of the window interface, displaying the directory icons contained in the platform file in the directory frame, displaying the program icons of one directory in one icon frame and moving the directory displayed in one of the icon frames as a unit to another icon frame; and (7) a pointing device connected to the computer for controlling movements of a cursor displayed by the control program on the displaying device, and pointing and dragging one of the directory icons or program icons displayed in the window interface by using the cursor.

8 Claims, 2 Drawing Sheets

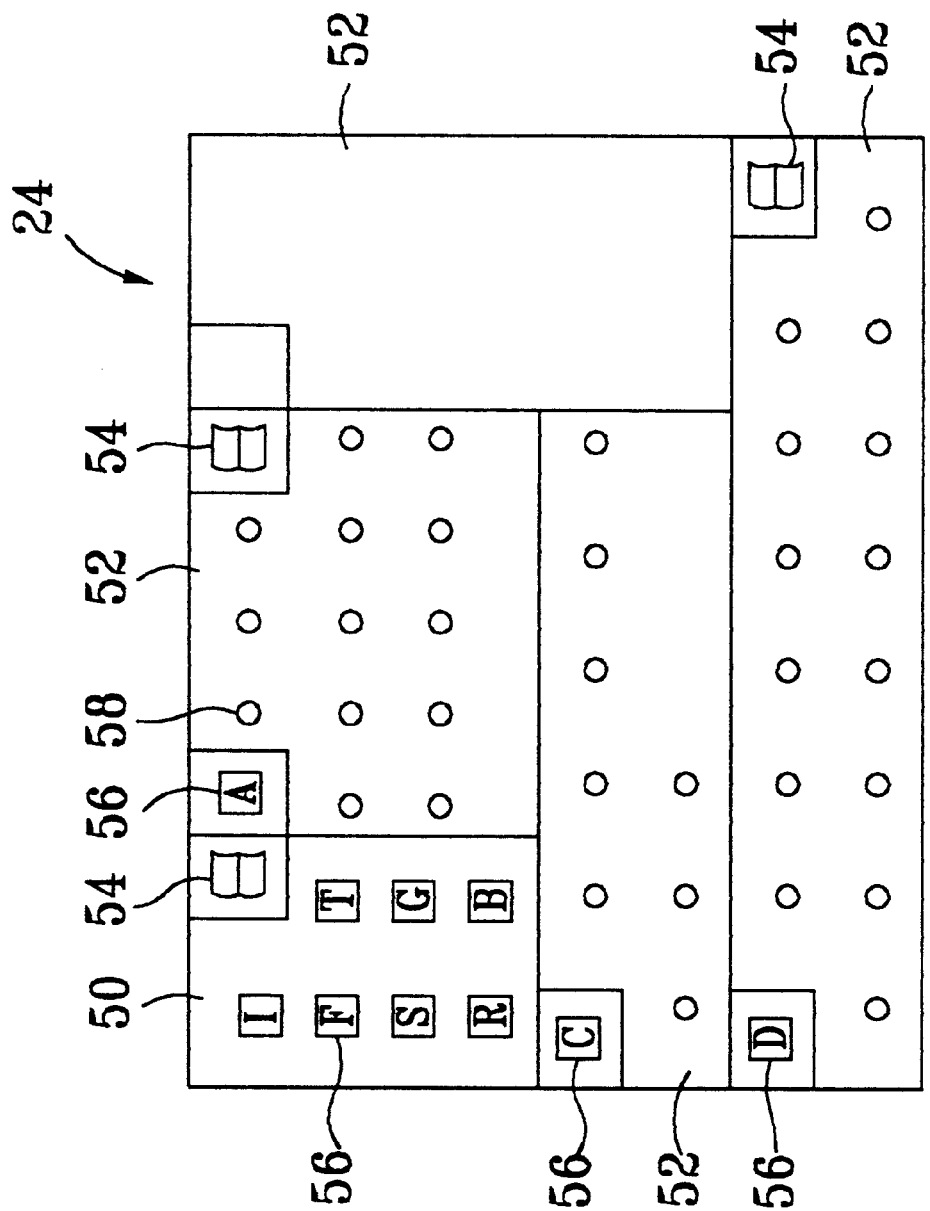

DISPLAY CONTROL SYSTEM HAVING A WINDOW INTERFACE FOR ORGANIZING PROGRAM AND DIRECTORY ICONS

BACKGROUND OF THE INVENTION

1. Field of the Invention

The present invention relates to a display control system of a personal computer, and more particularly, to a display control system having a window interface for organizing program and directory icons.

2. Description of the Prior Art

Window-based interfaces are widely used in personal computers. An application program is usually displayed as a program icon in a window interface. Icon frames, like document folders for storing and managing various documents, are commonly used for organizing program icons and the program icons contained in one icon frame is defined as one directory.

A user can create various icon frames on a window interface to organize all the program icons. The icon frames can be displayed within or beyond a rectangular boundary of a window interface, and each icon frame can be opened and closed by using a mouse and a cursor displayed in the window interface. When an icon frame is closed, it will be displayed as a directory icon, and the closed icon frame can be re-opened by pointing the cursor to the directory icon and clicking the left button of the mouse twice. The program of a program icon can also be executed in the same manner. If a user wants to execute a program in a closed icon frame, the user has to locate the directory icon of the icon frame, open the icon frame, locate the program icon, and then execute the program.

Since icon frames and directory icons can be freely moved within or beyond a rectangular boundary of a window interface, or overlap with other icon frame, it is sometimes difficult to find an icon frame or a directory icon in a window interface. If one target icon frame or directory icon is overlapped by other icon frames, all the icon frames covered above the target icon frame or directory icon have to be removed first before the target icon frame or directory icon can be located. If the target icon frame or directory icon is located beyond the rectangular boundary of a window interface, the content of the window interface will have to be scrolled in order to locate the target icon frame or directory icon. Locating a hidden icon frame or a directory icon is sometimes a very time consuming job and is very inconvenient to a user.

SUMMARY OF THE INVENTION

It is therefore a primary objective of the present invention to provide a display control system which can properly organize the icon frames and directory icons within a window interface to solve the aforementioned problems.

In a preferred embodiment, the present invention provides a display control system comprising:

a computer having a memory for storing programs and files, and a processor for executing the programs stored in the memory;

a displaying device connected to the computer for displaying a rectangular window interface;

a plurality of application programs stored in the memory;

a plurality of directories stored as directory files in the memory, each of the directory files being used for storing a plurality of program entries, each of the program entries comprising an address of one of the application programs stored in the memory and a program icon representing the application program;

a platform file stored in the memory for storing a plurality of directory entries, each directory entry comprising an address of one of the directory files stored in the memory and a directory icon representing the directory of the directory file;

a control program stored in the memory for displaying a directory frame and a plurality of icon frames in a non-overlapping manner within the rectangular boundary of the window interface, displaying the directory icons contained in the platform file in the directory frame, displaying the program icons contained in one of the directories in one of the icon frames and moving the directory displayed in one of the icon frames as a unit to another icon frame; and a pointing device connected to the computer for controlling movements of a cursor displayed by the control program on the displaying device, and pointing and dragging one of the directory icons or program icons displayed in the window interface by using the cursor.

It is an advantage of the present invention that the directory frame and icon frames are arranged in a non-overlapping manner within the rectangular boundary of a window interface and each directory can be displayed in any of the icon frames or moved between the icon frames as a unit so that a user doesn't need to remove any icon frame when locating a directory icon or program icon.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 3 shows a window interface of the display control system according to the present invention.

DETAILED DESCRIPTION OF THE PREFERRED EMBODIMENT

Figure 1:
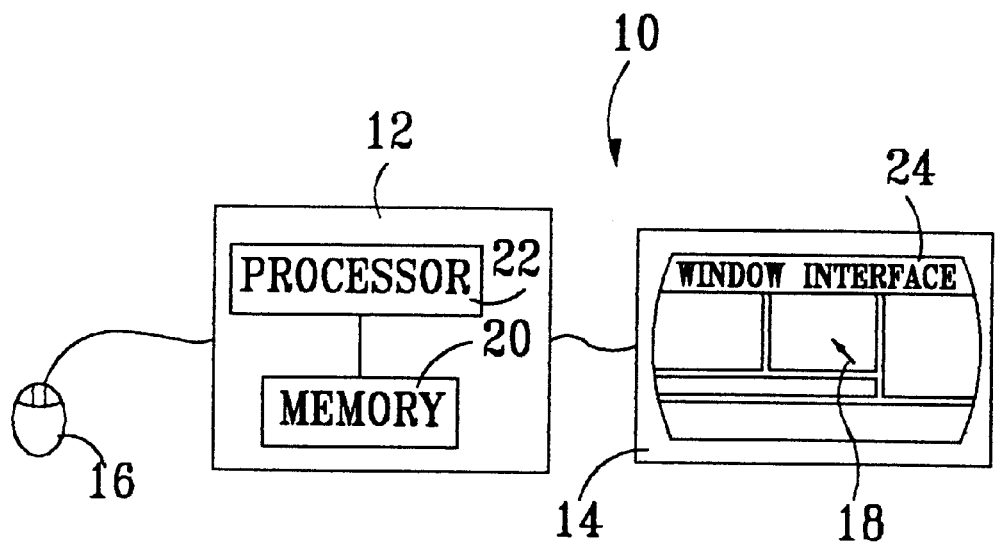
FIG. 1 is a functional block of a display control system according to the present invention.

Please refer to FIG. 1. FIG. 1 is a functional block of a display control system 10 according to the present invention. The system 10 comprises a computer 12, a displaying device 14 connected to the computer 12 for displaying a window interface 24, and a pointing device 16 which is a mouse connected to the computer 12 for controlling movements of a cursor 18 shown on the displaying device 14. The computer 12 comprises a memory 20 for storing programs and files, and a processor 22 for executing the programs stored in the memory 20.

Figure 2:
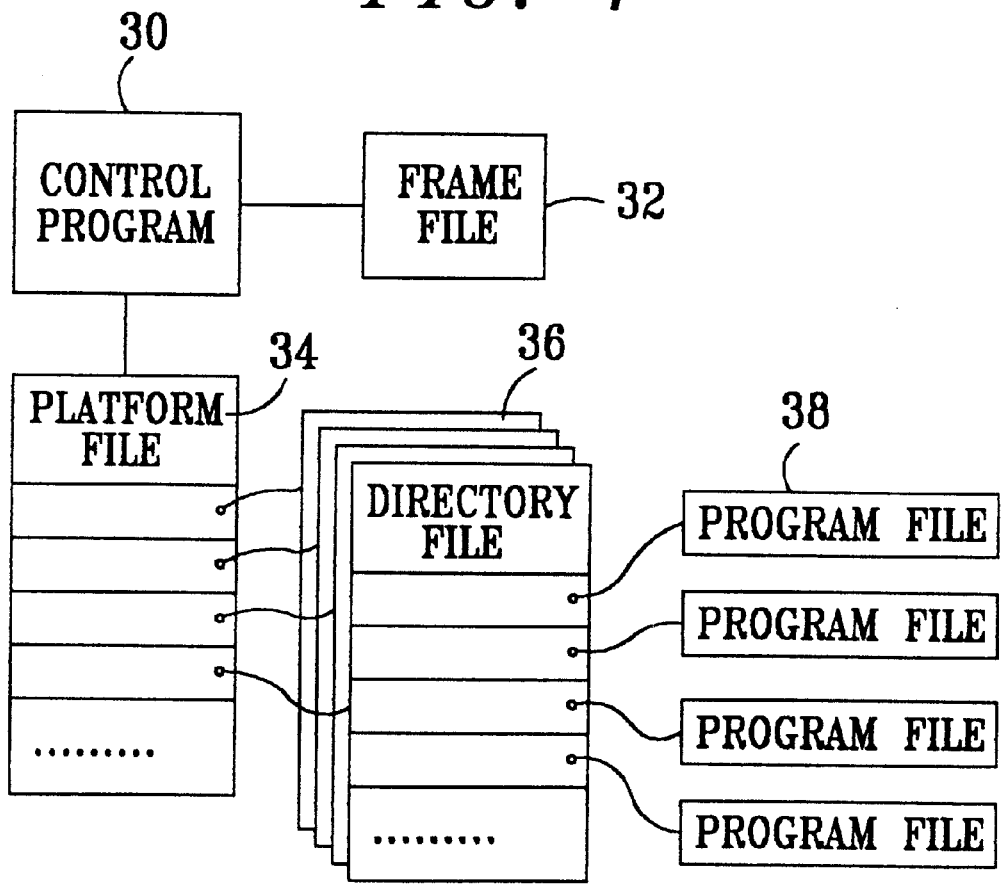
FIG. 2 is a software structure of the display control system according to the present invention.

Please refer to FIG. 2. FIG. 2 is a software structure of the display control system 10 according to the present invention. The system 10 comprises a control program 30. The control program 30 is the kernel of the display control system 10 for controlling the window interface 24 and cursor 18. The file structure of the control program 30 stored in the memory 20 comprises a frame file 32, a platform file 34, a plurality of directories stored as directory files 36 in the memory 20, and a plurality of application programs stored as program files 38 in the memory 20. The frame file 32 is used for storing information displayed in the interface 24. The platform file 34 is used for storing a plurality of directory entries. Each directory entry contains an address of a corresponding directory file 36 stored in the memory 20, and a directory icon representing the directory. Each directory file 36 comprises a plurality of program entries, and each program entry comprises an address of a program file 38 stored in the memory 20 and a program icon representing the program.

Please refer to FIG. 3. FIG. 3 shows the window interface 24 of the display control system 10 according to the present invention. The window interface 24 comprises a directory frame 50 and a plurality of icon frames 52. The directory frame 50 and icon frames 52 are displayed at fixed positions on the window interface 24. The positions and information displayed within each frame are stored in the frame file 32. The frame file 32 may contain many different frame sets and each frame set contains one directory frame 50 and a plurality of icon frames 52 which can be displayed in a non-overlapping manner within the rectangular boundary of the window interface 24. A user can choose one frame set to organize all the directory and program icons. Since the directory frame 50 and icon frames 52 are displayed in a non-overlapping manner within the rectangular boundary of the interface 24, a user can easily locate a target directory or program icon without moving the directory frame 50 and icon frames 52.

A plurality of directory icons 56 and a page icon 54 can be displayed in the directory frame 50, and each directory icon 56 represents a directory file 36. The presence of a page icon 54 indicates that more directory icons 56 can be seen by using the page-up and page-down keys on the keyboard, or by pointing the cursor 18 to the upper portion or the lower portion of the page icon 54 to perform the page-up or page-down function. If the directory frame 50 can accommodate all directory icons 56, the control program 30 will not display the page icon 54. In the same manner, each icon frame 52 can contain a plurality of program icons 58, one directory icon 56 and a page icon 54 in it. Each program icon 58 represents a program file 38. If one icon frame 52 can accommodate all program icons 58 of one directory, the control program 30 will not display the page icon 54 in it.

The directory frame 50 only displays the directory icons 56 of those directories which are not displayed in any of the icon frames 52. When a directory icon 56 is dragged from the directory frame 50 to a target icon frame 52 by using the cursor 18, the control program 30 will display the program icons 58 contained in the directory of the dragged directory icon 56 in the target icon frame 52. If one directory icon 56 and its program icons 58 are already displayed in the target icon frame 52, the control program 30 will remove the existing directory icon 56 and its program icons 58 from the target icon frame 52 before moving the directory of the dragged directory icon 56 into it. The removed directory icon 56 will then be placed in the directory frame 50 by the control program 30.

The procedure for dragging a directory icon 56 from the directory frame 50 to an icon frame 52 is described is follows:

Step 1: point a directory icon 56 inside the directory frame 50 by using the pointing device 16 and the cursor 18;

Step 2: drag the pointed directory icon 56 to a target icon frame 52 by using the pointing device 16;

Step 3: check if the target icon frame 52 has any directory icon 56 in it; if not, go to Step 5;

Step 4: remove the existing directory icon 56 and its program icons 58 from the target icon frame 52 and place the existing directory icon 56 into the directory frame 50;

Step 5: display the pointed directory icon 56 and its program icons 58 in the target icon frame 52; if the target icon frame 52 can not accommodate all the program icons 58, display a page icon 54 in the target icon frame 52.

The directory icon 56 and its corresponding program icons 58 in an icon frame 52 can also be dragged to another icon frame 52, and the procedure is described as follows:

Step 1: point a directory icon 56 displayed in an icon frame 52 by using the pointing device 16 and the cursor 18;

Step 2: drag the pointed directory icon 56 to a target icon frame 52 by using the pointing device 16;

Step 3: check if the target icon frame 52 has any directory icon 56 in it; if not, go to Step 5;

Step 4: remove the existing directory icon 56 and its program icons 58 from the target icon frame 52, and place the existing directory icon 56 into the directory frame 50;

Step 5: display the pointed directory icon 56 and its program icons 58 in the target icon frame 52; if the icon frame 52 can not accommodate all the program icons 58 of the pointed directory icon 56, display a page icon 54 in the target icon frame 52;

Step 6: remove the pointed directory icon 56 and its program icons 58 from the previous icon frame 52.

A directory icon 56 inside an icon frame 52 can be dragged into the directory frame 50. This is treated as closing the directory of the directory icon 56 displayed in the icon frame 52. The procedure is described as follows:

Step 1: point a directory icon 56 in an icon frame 52 by using the pointing device 16 and the cursor 18;

Step 2: drag the pointed directory icon 56 to the directory frame 50 by using the pointing device 16;

Step 3: remove the program icons 58 of the pointed directory icon 56 from the previous icon frame 52.

Comparing with prior art window-based display control systems, the directory frame 50 and icon frames 52 of the present invention are independent from the directory icons 56 and program icons 58 displayed inside. The directory frame 50 and the icon frames 52 function as various rooms of a hotel, and the directory icons 56 and the program icons 58 are treated like hotel guests who can stay in various rooms. Each directory icon 56 and its program icons 58 can be moved as a single unit around the directory frame 50 and icon frames 52 by dragging the directory icon 56. Because the directory frame 50 and icon frames 52 are not overlapped with each other inside the rectangular boundary of the window interface 24, it is not necessary for a user to move any of the directory frame 50 and icon frames 52 when locating a target directory icon 56 or program icon 58.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A display control system comprising:

a computer having a memory for storing programs and files, and a processor for executing the programs stored in the memory;

a displaying device connected to the computer for displaying a rectangular window interface;

a plurality of application programs stored in the memory;

a plurality of directories stored as directory files in the memory, each of the directory files being used for storing a plurality of program entries, each of the program entries comprising an address of one of the application programs stored in the memory and a program icon representing the application program;

a platform file stored in the memory for storing a plurality of directory entries, each directory entry comprising an address of one of the directory files stored in the memory and a directory icon representing the directory of the directory file;

a control program stored in the memory for displaying a directory frame and a plurality of icon frames in a non-overlapping manner within the rectangular boundary of the window interface, displaying the directory icons contained in the platform file in the directory frame, displaying the program icons contained in one of the directories in one of the icon frames, and moving the directory displayed in one of the icon frames as a unit to another icon frame in a manner that the directory frame and icon frames are independent from the directory icons and program icons; and a pointing device connected to the computer for controlling movements of a cursor displayed by the control program on the displaying device, and pointing and dragging one of the directory icons or program icons displayed in the window interface by using the cursor.

2. The display control system of claim 1 wherein the directory of each of the directory icons displayed in the directory frame is not displayed in any of the icon frames.

3. The display control system of claim 1 wherein any of the directory icons displayed in the directory frame can be dragged into one of the icon frames as a target icon frame, and the control program will display the program icons of the dragged directory icon in the target icon frame.

4. The display control system of claim 3 wherein if the target icon frame already contains one directory before the dragged directory is dragged into it, the control program will remove the program icons of the existing directory before displaying the program icons of the dragged directory in the target icon frame.

5. The display control system of claim 1 wherein each of the icon frames comprises a predetermined area for displaying a directory icon, and wherein when the program icons of one directory is displayed in one of the icon frames by the control program, it will also display the directory icon of the directory in the predetermined area of the icon frame.

6. The display control system of claim 5 wherein each directory icon displayed in the predetermined area of one of the icon frames can be dragged to another target icon frame by using the pointing device, and the control program will move the program icons of the dragged directory icon to the target icon frame.

7. The display control system of claim 5 wherein each directory icon in the directory frame can be dragged to one of the icon frames as a target icon frame by using the pointing device, and the control program will display the program icons of the dragged directory icon in the target icon frame.

8. The display control system of claim 5 wherein the directory icon displayed in the predetermined area of the icon frame can be dragged to the directory frame by using the pointing device, and the control program will remove the program icons of the dragged directory icon displayed in the icon frame.

* * * * *